(12) United States Patent
Sage (10) Patent No.: US 11,179,854 B2
(45) Date of Patent: Nov. 23, 2021

(54) METHODS AND SYSTEMS FOR CUTTING

(71) Applicant: SSI Shredding Systems, Inc., Wilsonville, OR (US)

(72) Inventor: Lee Sage, Tigard, OR (US)

(73) Assignee: SSI Shredding Systems, Inc., Wilsonville, OR (US)

(*) Notice: Subject to any disclaimer, the term of this patent is extended or adjusted under 35 U.S.C. 154(b) by 129 days.

(21) Appl. No.: 16/544,272

(22) Filed: Aug. 19, 2019

(65) Prior Publication Data

US 2020/0156257 A1 May 21, 2020

Related U.S. Application Data

(60) Provisional application No. 62/768,529, filed on Nov. 16, 2018.

(51) Int. Cl.
*B25J 11/00* (2006.01)
*G05B 19/18* (2006.01)
*B25J 9/16* (2006.01)

(52) U.S. Cl.
CPC ......... *B25J 11/0055* (2013.01); *B25J 9/1697* (2013.01); *G05B 19/182* (2013.01); *G05B 2219/37355* (2013.01); *G05B 2219/45054* (2013.01); *G05B 2219/50391* (2013.01)

(58) Field of Classification Search
CPC ... B25J 11/0055; B25J 9/1697; G05B 19/182; G05B 2219/37355; G05B 2219/45054; G05B 2219/50391
USPC ........................................................ 700/112
See application file for complete search history.

(56) References Cited

U.S. PATENT DOCUMENTS

| | | | | |
|---|---|---|---|---|
| 9,106,809 | B2 * | 8/2015 | Reynolds | ................ B02C 21/02 |
| 2009/0319077 | A1 * | 12/2009 | Cameron | ............. G05B 19/401 |
| | | | | 700/173 |
| 2018/0210424 | A1 * | 7/2018 | Besik | ................... B23K 37/006 |

OTHER PUBLICATIONS

Multi-Conveyor LLC, Camera Vision Sensor & Reject Conveyor, Jul. 30, 2015, YouTube, https://www.youtube.com/watch?v=Y4RAV9hYwlU (Year: 2015).*

(Continued)

*Primary Examiner* — Rocio Del Mar Perez-Velez
*Assistant Examiner* — Christopher W Carter
(74) *Attorney, Agent, or Firm* — McCoy Russell LLP (57) ABSTRACT

Methods and systems are provided for disassembling products. In one example, a system may comprise a cutting room having a positioning device configured to position products at a cutting system, where cut products may fall to a transport system to be conveyed to a storage system. In some examples, the cutting room is fully automated.

18 Claims, 5 Drawing Sheets

(56) References Cited

OTHER PUBLICATIONS

Machine DT, Machine reject conveyor, Nov. 1, 2018, YouTube, https://www.youtube.com/watch?v=4lseF6UClbE (Year: 2017).*

Tramantec, Package Scan and Reject | Conveyor Belt System with 5 Independent Sensors and Scanners | Trimantec, Jun. 20, 2016, YouTube, https://www.youtube.com/watch?v=-wR-pinYwck (Year: 2016).*

"ABB IRB 2600 Robot Waterjet Cutting Box Robot su jeti," YouTube Website, Available Online at https://www.youtube.com/watch?reload=9&v=MXkjMw250Fk, Aug. 30, 2012, 3 pages.

"JENOPTIK-VOTAN® BIM—Robot Based Laser Cutting Machine—Laser Processing," YouTube Website, Available Online at https://www.youtube.com/watch?v=lAdk1HY3wDU, Sep. 29, 2015, 3 pages.

"Robotic 3D Laser Cutting ( Robotik 3D Lazer Kesme )," YouTube Website, Available Online at https://www.youtube.com/watch?v=u0xG48aQ2xo, Mar. 6, 2016, 3 pages.

* cited by examiner

METHODS AND SYSTEMS FOR CUTTING

CROSS REFERENCE TO RELATED APPLICATIONS

The present application claims priority to U.S. Provisional Application No. 62/768,529, titled "METHODS AND SYSTEMS FOR CUTTING", and filed on Nov. 16, 2018. The entire contents of the above-identified application are hereby incorporated by reference for all purposes.

FIELD

The present description relates generally to methods and systems for disassembling large objects.

BACKGROUND

Material disposal can take many forms. However, in some instances, merely throwing away, repurposing or recycling an object may be insufficient. For example, in some circumstances, it may be desirable to track each item that is disposed. In other examples, it may be desirable to disassemble products so that they cannot be reassembled. Further, entities may demand that their products be disassembled in a specific manner. For example, developers of prototypes in highly competitive industries may want their products not only reduced to a non-functioning condition, but also destroyed in a way that minimizes or eliminates any information that may be obtained from the remaining pieces. In the instance of ordnance, government guidelines dictate that decommissioned weapons are to be demilitarized in a specific manner. Larger caliber weapons (e.g., weapons above 7.62 mm) may not be properly decommissioned, or even fit in, currently used disposal units. As an example, the Dual-Shear® M100, a low-speed, high-torque, two-shaft rotary shear shredder, is one of the largest available shredders configured to cut decommissioned weapons in accordance with government guidelines, however it cannot shred items over 7.62 mm, leaving entire classes of weaponry without a means of automated demilitarization. While materials with specific destruction requirements can be broken down manually, such procedures have a number of shortcomings.

Manual destruction is labor intensive, time consuming, requires a significant commitment to training, and may expose workers to toxic chemicals. As one example, manual destruction of ordnance may require the use of metal cutting tools such as oxyacetylene torches or plasma cutters. Oxyacetylene torches produce a flame comprising a temperature similar to 3000 C, which may result in a high temperature work environment and may produce hot materials falling from the product during the cutting process. Furthermore, the resulting pieces may be sharp and may emit fumes during the cutting process. Each of these outcomes may be undesired by the operator performing the cutting. There is thus a demand for a method to automate materials disposal that provides flexibility in the disposal process, allowing for the destruction of materials according to desired parameters in an efficient manner. There is further a desire for means to track the items being disposed, ensuring that each item has been disposed of in the appropriate manner.

SUMMARY

In one example, the issues described above may be addressed by a system comprising a cutting room having a receiving device configured to orient a product in a desired position, a cutting system comprising at least one cutter, a transport system comprising at least one transport device arranged below the at least one cutter, and at least one outlet associated with the transport device, wherein the cutting system is configured to administer a plurality of pseudo-randomized cuts to the product via the at least one cutter. The system may be configured to process one or more types of products at a time. In some examples, the system may further include an identification system coupled to the cutting system that allows for the automatic or manual configuration and re-configuration of the cutting system to administer a plurality of pseudorandomized cuts appropriate for the product being destroyed. There may further by a system and which tracks the specific items being destroyed and their resulting components.

For example, in one aspect, the cutting system may be configured to transport a plurality of identical products through the cutting room to be disassembled into a plurality of non-identical pieces. In another aspect, the cutting system may be configured to identify and transport a plurality of non-identical products through the cutting room to be disassembled into a plurality of pieces, wherein the placement and type of cuts are configured based on the identity of the object being transported.

As one example, the product may be a first product of a plurality of products, wherein the plurality of products is a single type of product (e.g., an assault rifle). Each product of the plurality of products may be transported into the cutting room, where the cutting system may disassemble each product of the plurality of products into one or more differently sized pieces. That is to say, the plurality of pseudorandomized cuts may cut each product of the plurality of products in different orientations and/or locations such that pieces cut off from a whole, first product of the plurality of products, may not match pieces cut off from a whole, second product of the plurality of products. By doing this, reassembly of the product via the pieces cut off therefrom may be more difficult compared to non-pseudorandomized cuts which may produce identical pieces.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to systems and methods for a cutting kit, where the cutting kit may comprise a cutting room and the contents therein. The cutting room may engage with an interfacing wall arranged at a portion of the room that provides access from the exterior of the room, allowing for objects intended for destruction to be introduced into the cutting room. The interfacing wall may correspond to a wall of the cutting room, comprising all or part of a wall of the cutting room. The interfacing wall may provide any access type useful. In some aspects, the interfacing wall may allow the introduction of one or more products at a time into the room for destruction. The interfacing wall may comprise a plurality of cells, containers, or other storage devices shaped to hold one or more of a product to be disassembled in the cutting room. The interfacing wall may allow for automatic or manual introduction of a product into the room for disassembly. An exemplary cutting kit is shown in FIG. 1.

Figure 2:
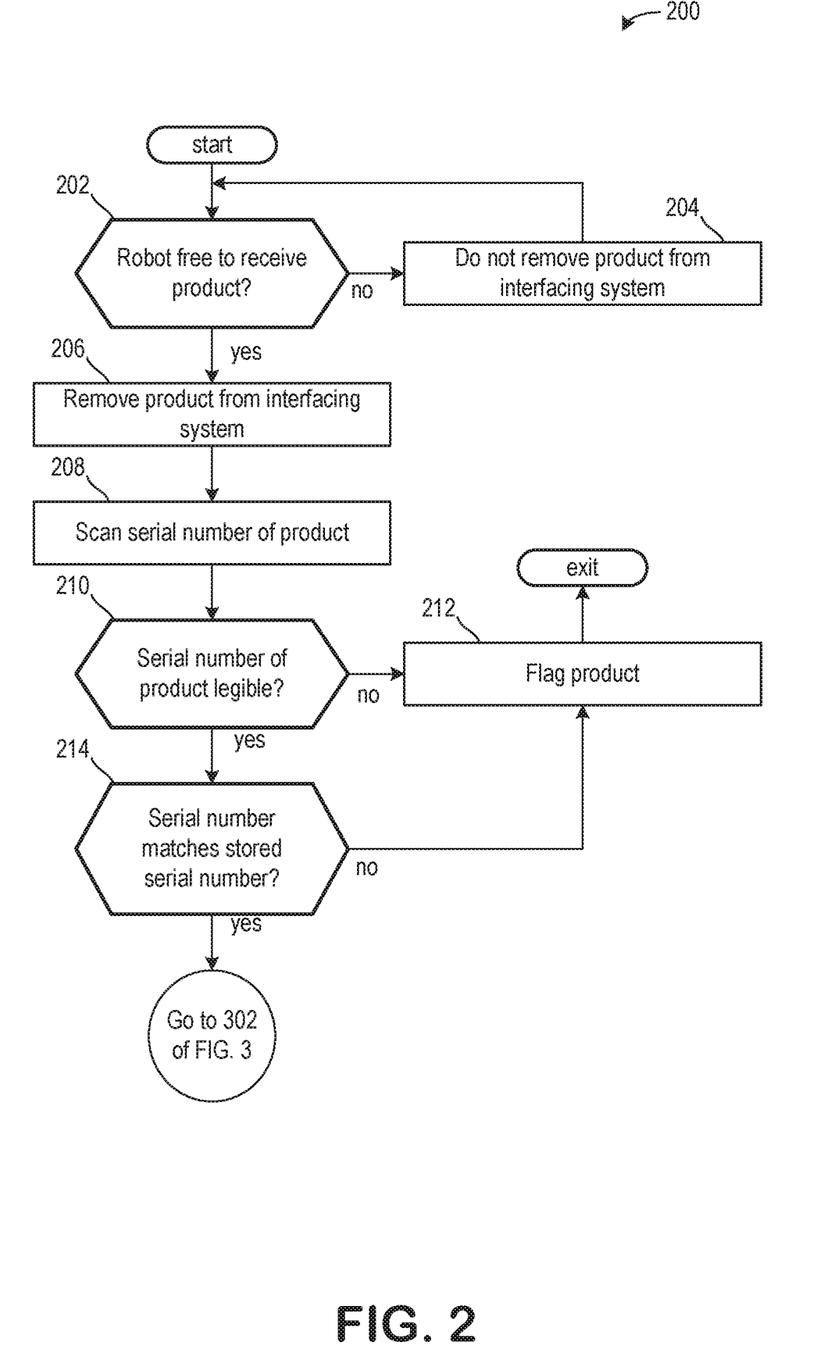
FIG. 2 shows a method for introducing a product into a cutting room.
Figure 3:
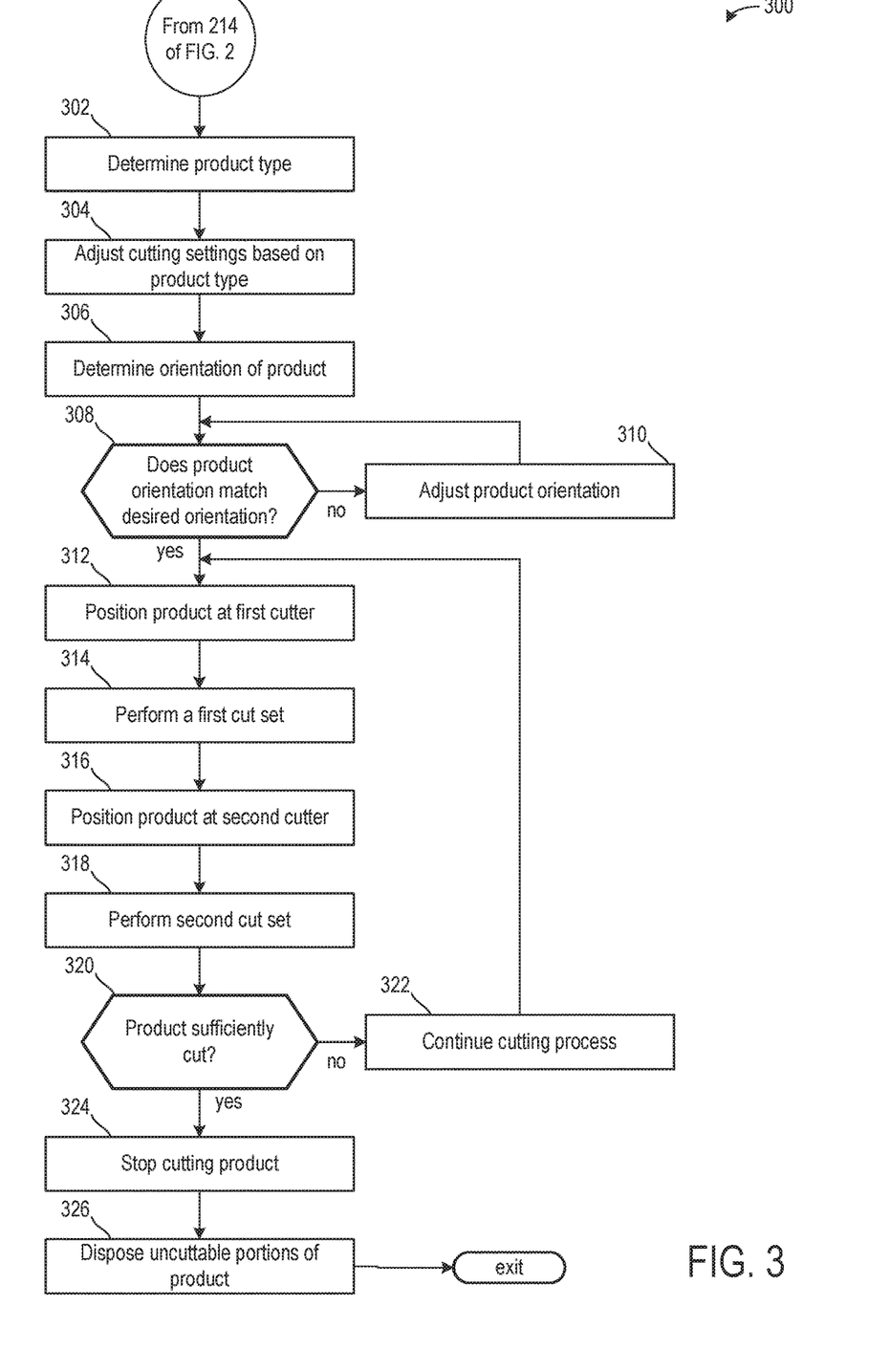
FIG. 3 shows a method for cutting the product in the cutting room.
Figure 4:
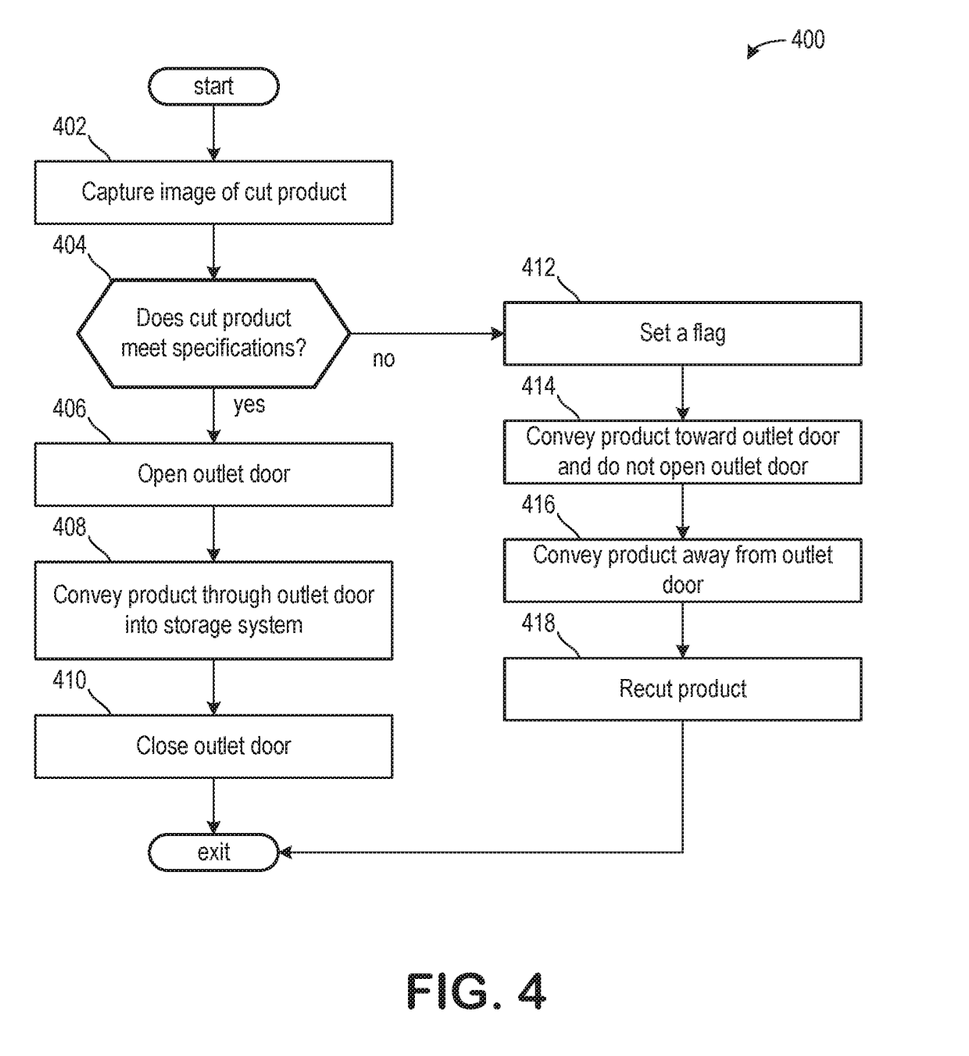
FIG. 4 shows a method for determining if the product is cut properly.
Figure 5:
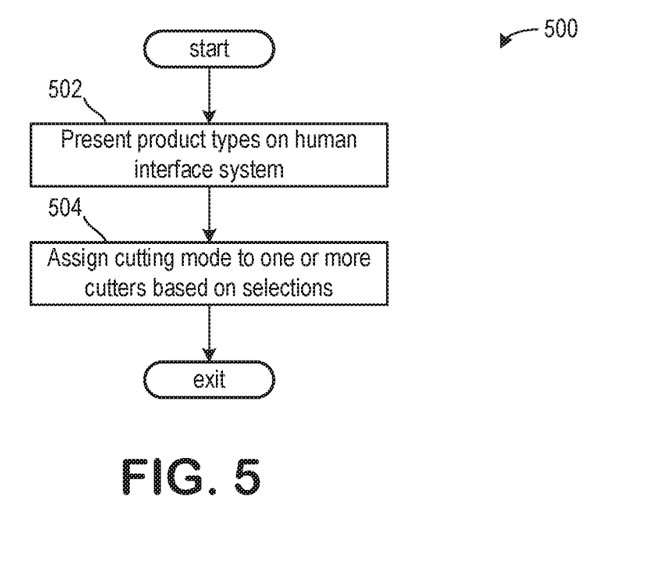
FIG. 5 shows a method illustrating an operator manually selecting a cut mode via a human interface system.
Figure 6:
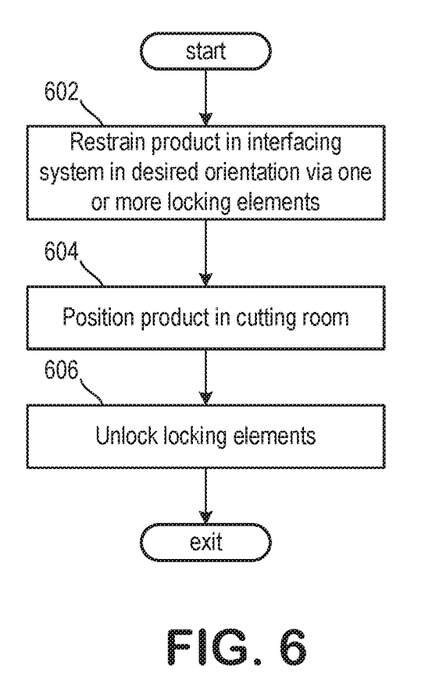
FIG. 6 shows a method for fixedly arranging a product for the cutting room to receive.

The cutting room of the cutting kit may comprise a robot or similarly automated device configured to position a product at one or more cutting stations. A method for receiving the product from the interfacing wall is shown in FIG. 2. FIG. 3 illustrates a method for identifying the product and cutting the product. FIG. 4 illustrates a method for determining if the cut meets a desired cutting protocol. FIG. 5 shows a method illustrating an operator manually selecting a cut mode via a human interface system. FIG. 6 shows a method for fixedly arranging a product for the cutting room to receive.

Figure 1:
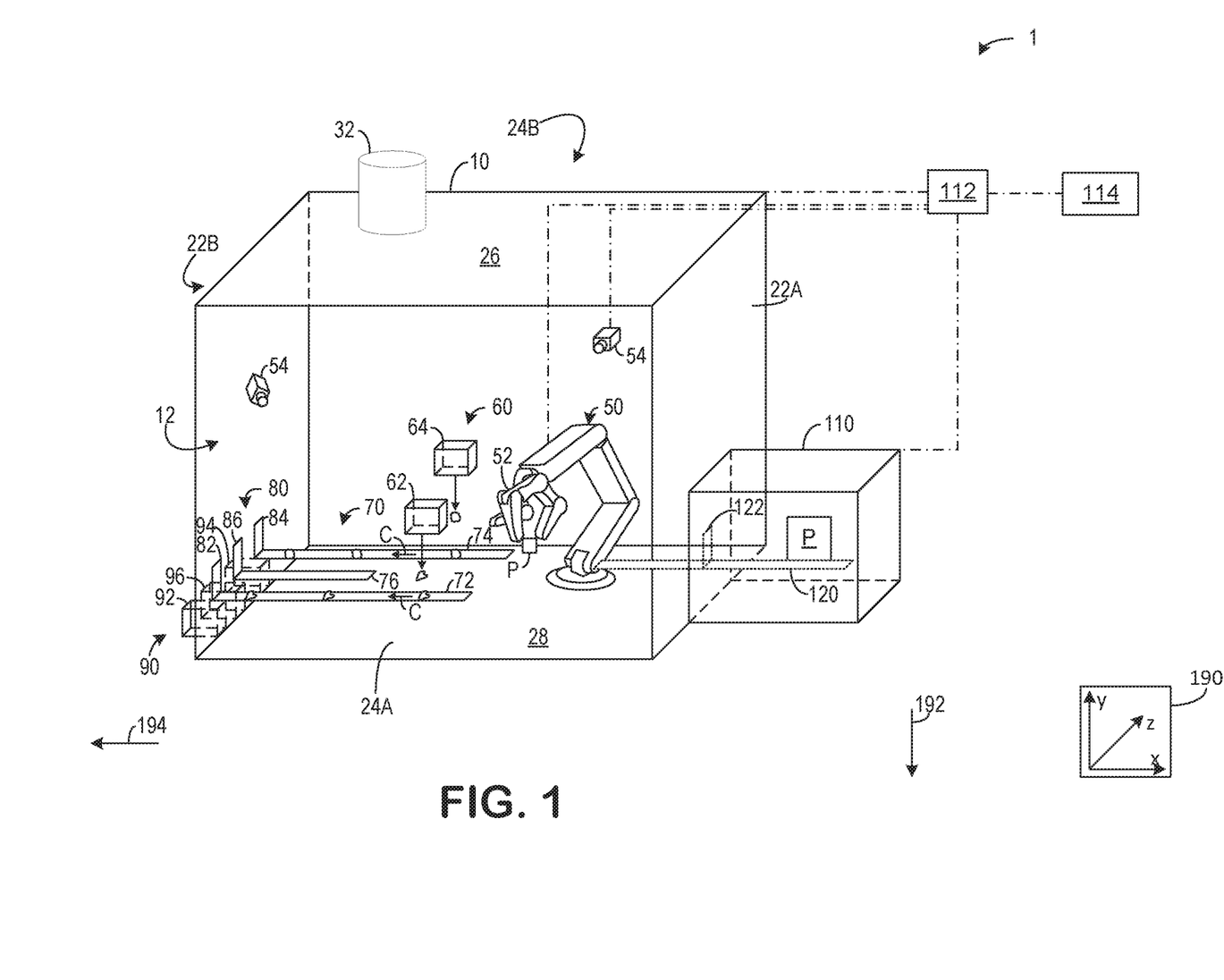
FIG. 1 shows an embodiment of a cutting kit.

FIG. 1 shows an example configuration with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

Turning now to FIG. 1, it shows a cutting kit 1 for disassembling one or more products. Herein, the disassembling includes cutting. However, it will be appreciated by those of ordinary skill in the art that the disassembling may additionally or alternatively include crushing, compressing, sanding, grinding, deconstructing, dismantling, melting, and the like. The disassembling may function to destroy the product such that the disassembled product may not be reassembled and/or recognizable.

An axis system 190 having three axes, namely an x-axis parallel to a horizontal direction, a y-axis parallel to a vertical direction, and a z-axis perpendicular to both the x- and y-axes. A direction of gravity is shown via arrow 192 (herein, gravity 192). A general direction of product conveyance is shown via horizontal arrow 194. Dashed lines indicate components or portions of the cutting kit 1 obstructed by other components of the cutting kit 1, which would be otherwise hidden from view. Furthermore, a front surface 24A is illustrated as transparent in the embodiment of FIG. 1 to display an interior 12 of a cutting room 10 of the cutting kit 1.

The cutting room 10 may be a sealed box with one or more openings optionally coupling the cutting room to an ambient atmosphere. The cutting room 10 may be cube-shaped, rectangular prism-shaped, round, or the like. In one example, the cutting room 10 is a box with four walls defining an area of the cutting room, wherein one or more of the walls may comprise one or more cutouts shaped to introduce product into the room, expel a disassembled product from the room, and/or allow/expel other desired items to and from the room. It will be appreciated that the cutting room 10 may be other shapes without departing from the scope of the present disclosure (e.g., trigonal pyramidal).

More specifically, the cutting room 10 may comprise a first side surface 22A, a second side surface 22B, the front surface 24A, a back surface 24B, a top surface 26, and a floor 28. The first side surface 22A may be directly opposite the second side surface 22B. Likewise, the front surface 24A may be directly opposite the back surface 24B. Similarly, the top surface 26 may be directly opposite the floor 28. Each of the first side surface 22A, the second side surface 22B, the front surface 24A, the back surface 24B, the top surface 26, and the floor 28 may be smooth, flat surfaces arranged perpendicularly to one another. One or more of the surfaces may comprise one or more cutouts for adjusting a flow of products to and from the room. Additionally or alternatively, the cutouts may be shaped to prevent and/or mitigate admission of one or more objects, including a user, during some operating conditions of the cutting room 10, as will be described in greater detail below.

In one example, the first side surface 22A may intersect with each of the front surface 24A and the back surface 24B at opposite extreme ends. The second side surface 22B, which is opposite the first side surface 22A as mentioned above, may intersect with the front surface 24A and the back surface 24B at opposite extreme ends. In this way, the first side surface 22A and the second side surface 22B may be separated by a length, measured along the x-axis, of the front and back surfaces 24A, 24B. The top surface 26 may be arranged along and intersect with an upper, outer edge of each of the first side surface 22A, the second side surface 22B, the front surface 24A, and the back surface 24B. The floor 28, which is opposite the top surface 26, may be arranged along and intersect with a lower, outer edge of each of the first side surface 22A, the second side surface 22B, the front surface 24A, and the back surface 24B. The top surface 26 may be separated from the floor 28 via a height, measured along the y-axis, of the first side surface 22A, the second side surface 22B, the front surface 24A, or the back surface 24B. Each of the first side surface 22A, the second side surface 22B, the front surface 24A, the back surface 24B, the top surface 26, and the floor 28 may define the cutting room 10, wherein an interior of the cutting room 10 may be incorporated with one or more instruments for dismembering a product, wherein the one or more instruments may be arranged in relation to the surfaces and floor of the cutting room 10.

The surfaces of the cutting room 10 may comprise one or more of plastic, metal, brick, iron, carbon fiber, glass, magnesium, concrete, particle board, fiberglass, composites, and a combination thereof. In some examples, one or more of the surfaces of the cutting room 10 may be transparent such that the interior of the cutting room 10 may be viewed without disabling or interrupting any of the components arranged therein. In other examples, one or more surface of the cutting room 10 may include a window or other means for viewing the interior of the room. In some examples, one or more cameras may be placed to allow the room to be viewed from one or more angles, wherein a live feed of the camera may be broadcast onto a monitor or other viewing device exterior of the cutting room. Such a monitoring or viewing device may be part of the cutting room kit, placed on an exterior surface of a cutting room wall, or may be a separate and/or remote device.

In some aspects, the cutting room 10 may include a ventilation system. The ventilation room may be part of one or more surfaces of the cutting room 10. For example, as shown in FIG. 1, a ventilation system 32 may be part of the top surface 26 of the room. The ventilation system 32 may be configured to exhaust gases from the interior 12 of the cutting room 10. The ventilation system 32 may comprise one or more vents and/or tubing along with one or more activatable devices (e.g., fans) to promote the discharge of gases from the interior 12. In one example, the ventilation system 32 is the only opening of the top surface 26, wherein the ventilation system 32 optionally fluidly couples the interior 12 to an environment external to the cutting room 10. In some embodiments, the ventilation system 32 may be omitted and top surface 26 may be smooth with no openings. It will be appreciated that in some aspects the ventilation system 32 may comprise a plurality of vents, arranged on one or more surfaces of the cutting room 10. In some aspects, the ventilation system 32 may merely vent to the exterior of the cutting room. In other aspects, it may connect to other systems such as a building heating, ventilation and air conditioning system for further processing. In additional aspects, it may be part of a single-pass air handling system.

The front surface 24A and the back surface 24B may be free of components. In some embodiments, the front surface 24A and the back surface 24B may comprise windows, doors, vents, tubing, cameras, sensors, and the like, additionally or alternatively. The front surface 24A and the back surface 24B may be arranged directly across from and parallel to one another. The front surface 24A and the back surface 24B are identical to one another in size and shape, in one example.

The first side surface 22A may comprise an interfacing system 110 configured to introduce one or more products to the interior 12 of the cutting room 10. In some embodiments, the interfacing system 110 may comprise an interfacing wall configured to actuate in response to a demand. In some examples, the demand may include the interior 12 of the cutting room 10 being in a condition capable of receiving product, as will be described in greater detail below.

The interfacing system 110 may be configured to provide one or more products (P) to the interior 12. In one example, the interfacing system 110 is a rotary tray, wherein the product P may be arranged on the tray. The tray may position the product away from the interior 12 until the product P is demanded, wherein the tray may rotate clockwise or counterclockwise, thereby positioning the product P in the interior 12. In one example, the interfacing system 110 may rotate 180°. Additionally or alternatively, the tray may slide along a track.

In some examples, the interfacing system 110 may comprise a plurality of cells, wherein product may be positioned in each of the cells. Each cell may be individually opened and closed relative to the interior 12 of the cutting room 10 such that only one cell may be coupled to the interior 12 at a time. As an example, if there are 20 cells each storing the same product (e.g., a gun), then only one of the 20 cells may be coupled to the interior 12 in response to a product demand. In one example, coupling the cell to the interior 12 includes opening a door to the cell. Additionally or alternatively, the cell may rotate about 180° to couple to the interior 12. In some examples, each cell may comprise only three-walls, wherein the cell may rotate to admit the product P to the interior 12. Additionally or alternatively, each cell may comprise a moving wall shaped to move on-demand, wherein the moving wall may slide, rotate, compress, or some other movement sufficient to introduce the product P to the interior 12.

In some examples, additionally or alternatively, the interfacing system 110 may comprise one or more conveyors shaped to feed product into the interior 12. The one or more conveyors may include conveyor 120, which may convey the product P along a longitudinal axis of the conveyor, where the product P may be identified, indexed and fed into the interior 12 through a cut-out 122 of the first side surface 22A. Identifying the product P may include identifying the type of product and/or the specific product being fed, for example the serial number of the specific product may be identified and recorded. Indexing the product P may include one or more of positioning the product P into the cutting room and orienting the product P in a desired orientation. The cut-out may comprise one or more features for permitting product P to be arranged on the one or more conveyors, including the conveyor 120, to enter the interior 12 while mitigating entrance of other undesired objects. As an example, the cutout 122 may comprise a sliding portion similar to a guillotine, where the sliding portion is shaped to actuate in response to the product P being within a threshold proximity (e.g., 12 inches/30 centimeters) of the cutout 122. The guillotine wall features may rise in response to the product P being within the threshold proximity to open the cutout 122 and allow the product P to be conveyed through, where the product P may be conveyed onto another conveyor or other device for transferring the product P along the interior 12 of the cutting room 10. Additionally or alternatively, the cutout 122 may be in the shape of a tunnel, hole, or other opening and/or passage dimensioned to allow the product P through, while being too small to permit other objects through (e.g., a human operator). In this way, the cutting kit 1 may comprise one or more features for blocking a human user from entering the interior 12 of the cutting room 10 during its operation, while conveying and/or admitting product P into the interior 12. Further, in some examples, the tunnel or other cutout 122 may provide ventilation control, restricting or minimizing the escape of noxious gasses in the cutting chamber into exterior spaces.

The interfacing system 110 may comprise one or more identifying components for identifying, characterizing, and/or indexing one or more of the products P positioned therein. The characterizing may be accomplished via RFID, imaging, weighing, user input, the like, or a combination thereof.

As an example, the interfacing system 110 may image the products positioned therein and request confirmation at a control module coupled to controller 112. The control module may include a touch screen and/or keyboard allowing the user to communicate with the control module. Following confirmation of the type of product arranged in the interfacing system 110, a cutting mode may be set, wherein the cutting mode comprises guidelines specific to the type of product.

As an example, if the product is a 7.62 mm coaxial machine gun, the cutting mode may be set to provide at least five cuts at various sections of the gun. Additionally or alternatively, if there are two types of products in the interfacing system 110, (e.g., 7.62 mm coaxial machine gun and a machine gun with a tripod), then two different cutting modes may be implemented. In such an example, each cell may be assigned with a particular cutting mode, wherein upon coupling of the cell to the interior 12, the cutting mode may be set.

Additionally or alternatively, a human interface system 114 may be coupled to the controller 112, wherein the human interface system 114 may present one or more options from a drop-down menu for a user to select. The drop-down menus may be separated into various categories, wherein each category corresponds to a type of product P the cutting room 10 may be configured to cut. For example, if the product P is an assault rifle, the operator may select weapons via a touch-screen and/or keyboard of the human interface system 114. The operator may then select assault weapons, wherein the human interface system 114 may illustrate an example figure of an assault weapon and one example of cuts which the assault weapon cutting mode may perform. The operator may confirm the selection and products P may begin to be positioned through the interfacing system into the cutting room 10.

In one example, additionally or alternatively, a catalog may be stored on a memory of the controller 112, wherein each product P may be identified prior to being delivered from the interfacing system 110 to the cutting room 10. Identifying the product P may include determining one or more of a make, model, year, use, assignment, previous owner, serial number, and the like. Once the product P is identified, the controller 112 may access the catalog and mark the specific product being positioned in the cutting room 10 for cutting. For example, if 1000 of the product P is scheduled to be cut, one or more imaging devices and/or a human operator may determine an exact identity of the product P, wherein the controller 112 may mark the one exact product of the 1000 of the product P in the catalog. The product P may be removed from the catalog once the cutting process is complete and the product P is disassembled to a desired specification meeting a set guideline. Thus, the catalog may now comprise 999 of the product P.

In other examples, a serial number or other identifying information regarding product P may be used to generate a database of deconstructed product P. Thus, as each product P is introduced into the cutting room, identifying information may be manually entered, automatically captured, or a combination thereof, creating a record of each product P that has been deconstructed. In some aspects, before and after images of each product P may be generated, creating a beginning and ending record of the deconstruction.

Product P may be received by a receiving device 50 arranged in the interior 12 of the cutting room 10. The receiving device 50 may be a plurality of different receiving devices without departing from the scope of the present disclosure. For example, the receiving device 50 may be a conveyor system having one or more conveyors. Additionally or alternatively, the receiving device 50 may be a manually operated crane, wherein the crane is operated from the control module of the controller 112. Herein, the receiving device 50 is a robot, and will be referred to as robot 50.

The robot 50 may comprise a receiving end 52 configured to engage with products arranged in the interfacing system 110. In one example, the receiving end 52 is a robot hand or a robot claw. The robot 50 may be actuated via force control in some examples. The robot 50 may be actuated electrically, pneumatically, hydraulically, or a combination thereof, additionally or alternatively. The robot 50 may further comprise one or more imaging systems arranged on its body, the receiving end 52, or arranged externally to the robot 50, wherein the imaging systems may communicate with the robot 50. In the embodiment of FIG. 1, the imaging systems comprises cameras 54.

The cameras 54 and the robot 50 may be coupled to controller 112. The controller 112 may receive feedback from the cameras 54 and adjust operation of the robot 50. For example, the cameras 54 may provide feedback regarding an orientation of the product P, a type of the product P, a destruction of the product P, or the like. In one example, the feedback may include an amount the product P deviates from a desired orientation. As another example, the feedback may include a destruction of the product P deviating from a desired destruction, wherein the feedback may indicate locations of the product P comprising cuts not meeting one more guidelines. The controller 112 may comprise non-transitory memory with instructions stored thereon that enable the controller to adjust operations of the robot 50. For example, the cameras 54 may signal to the controller 112 that an orientation of the product P is not a desired orientation. As such, the controller 112 may signal to an actuator of the receiving end 52 of the robot 50 to rotate, flip, spin, turn, and/or twist the product P to the desired orientation.

In some examples, the interfacing system 110 may present the product P in the desired orientation to the robot 50. For example, the operator may load the product P into the interfacing system 110 (e.g., on the infeed conveyor 120), wherein the product P may only be loaded in the interfacing system 110 in a single configuration matching the desired orientation. In one example, the infeed conveyor 120 comprises clamps which may maintain the product P in the desired orientation. Upon actuating the infeed conveyor 120 such that the product P is now positioned in the cutting room 10, the clamps may unlock, thereby allowing the robot 50 to retrieve the product P. By doing this, the robot 50 may receive the product in the desired orientation. In other examples, the robot 50 may receive the product P in any orientation. In some examples, additionally or alternatively, the infeed conveyor 120 and/or interfacing system 110 may present the product P to the robot 50 in a specific orientation via a variety of locking elements, which may include the clamp, but may additionally or alternatively include racks, fixtures, trays, molds, and the like. The product P may be held in place as it is conveyed to the robot 50, wherein the robot 50 may retrieve the product P from the locking element. As such, the product P may be fixed and unmoving as it is transferred to the robot 50.

Once it has been identified what type of product P the robot 50 has and that the product P is oriented in the desired orientation, then the robot 50 may transfer the product P to a cutting system 60. Transferring the product P may include extending and/or unfolding a body of the robot 50. Additionally or alternatively, some or all of the robot 50 may have a fixed length. As such, the robot 50 may be arranged on a track system wherein the robot 50 may be conveyed along a direction parallel to the x-axis between the cutting system 60 and the interfacing system 110.

The cutting system 60 may include one or more cutters. In the embodiment of FIG. 1, the cutting system 60 comprises a first cutter 62 and a second cutter 64. The first cutter 62 and the second cutter 64 may be robot cutters, shredding machines, or the like. For example, the shredding machine may comprise a plurality of blades configured to rotate, the blades further comprising teeth for dismembering products passing through the first 62 and second 64 cutters. As another example, the first cutter 62 and the second cutter 64 may be robot cutters comprising plasma cutters or oxyacetylene torches, wherein the robot cutters cut the product P at specific locations based on a selected cutting mode. The cutting mode may be automatically selected based on the type of product P being dismantled or may be selected by a user.

The cutters 62 and 64 may utilize the same or different types of cutting mechanisms. The accuracy of such cuts may be maintained by orienting the product P to the desired orientation and allowing the receiving end 52 of the robot 50 to remain coupled to a portion of the product P while the product P is being cut. Herein the first cutter 62 and the second cutter 64 are robot cutters comprising oxyacetylene torches.

In some examples, the cutting mode may include oscillating the product P between the first cutter 62 and second cutter 64. As an example, if the product P is a gun, then guidelines for demilitarization of the gun may dictate that the gun receive a first cut at a first position (e.g., the barrel). Furthermore, a desired amount of material may need to be displaced to meet demilitarization guidelines. For example, guidelines for not only the first cut, but for each cut for demilitarization of the gun may include a certain amount of material of the gun be displaced following the first cut. As such, the first cut may be a first cut set including a plurality of cuts arranged proximate to the first position. Cuts may be provided by the first cutter 62 and the second cutter 64 in sequence until the guidelines for the first cut are met. Additionally or alternatively, the first cutter 62 may perform all of the cuts of the first cut and following completion of the first cut, the robot 50 may position the remainder of the product P at the second cutter 64, where a second cut or cut set may be performed. The second cut or cut set may be at a different location of the product P and may comprise a similar or different number of cuts as the first cut set in similar or different configurations. The robot may continue to position the product P at each of the first cutter 62 and/or the second cutter 64 until a sufficient number of cuts are performed and the destruction guidelines are met.

In some examples, the first cutter 62 and the second cutter 64 may be used in combination to perform a series of cuts meeting a cut specification. For example, if the product is a gun, then the first cutter 62 may perform a first cut of the series of cuts at a specified location. The robot 50 may position the gun at the second cutter 64 following the first cut, wherein the second cutter 64 may perform a second cut, of the first cut set or of a different cut set, at the specified location, wherein the second cut is pseudorandomized such that the second cut may not match the first cut. That is to say, the second cut may extend toward the first cut, away from the first cut, through the first cut, etc. The gun may be returned to the first cutter 62, wherein a third cut may be performed, the third cut also being randomized. This process may continue until a sufficient amount of the gun is removed at the specified location, completing the cut set.

Pseudorandomized cutting may comprise cutting the product P such that the same cut is not repeated twice on the same product P. That is to say, the cutting mode may comprise a list of cuts which meet the guidelines. Following performance of one of the cuts from the list, the cut may not be repeated until each of the other cuts on the list are performed, in one example. As another example, a first cut from the list may not be repeated until a threshold number of other cuts from the list have been performed. The threshold number is equal to a non-zero, positive integer. Additionally or alternatively, the receiving end 52 of the robot 50 may randomly rotate at the cutting system 60. In this way, the first cutter 62 and the second cutter 64 may cut in a single fashion, wherein the variation between each cut is introduced via actuation of the product P via the robot 50. For example, the receiving end 52 may gyrate, oscillate, vibrate, and the like when positioning the product P at the first cutter 62 or second cutter 64. Actuating the product P via the receiving end 52 may include actuating the receiving end 52 in relatively small movements (e.g., less than 1 inch) such that the desired number of cuts may occur at the specified location of the product P.

Additionally or alternatively, the first cutter 62 and the second cutter 64 may be configured to cut linearly, zig-zag, undulating, curved, and the like. As such, the cuts performed by the first cutter 62 and the second cutter 64 may be rough. Additionally or alternatively, the first cutter 62 and the second cutter 64 may provide smooth cuts.

Cutting guidelines may dictate the minimum number and placement of cuts to be performed. For example, if the product P is a 7.62 mm coaxial machine gun, demilitarization guidelines may dictate that the machine gun be cut at five different positions. As such, the robot 50 may position the gun at the first cutter 62 to cut the gun at a first position, wherein the first cutter 62 may repeatedly cut at or near the first position until a sufficient amount of material is displaced to meet the guideline requirements. The robot 50 may then position the gun at the second cutter 64, wherein the second cutter cuts the gun at a second position. The robot 50 may continue to position the gun under the first and second cutters 62, 64 until the entire body of the gun is sufficiently cut to meet the specified requirements.

In some examples, additionally or alternatively, there may be a plurality of robots, wherein a number of robots is equal to a number of cutters. In such an example, each cutter may be configured to perform all of the desired cuts. In this way, each robot may correspond with an individual cutter, wherein the cutter may perform all of the cuts needed to complete the destruction of the product.

As the product P is cut at the first cutter 62 and second cutter 64, segments of the product P may fall to a first transport device 72 and a second transport device 74, respectively, of a transport system 70. The transport system 70 may further comprise a third transport device 76 which is unassociated with a cutter. As such, the third transport device 76 may be configured to transfer portions of the product P which are not susceptible to cutting (e.g., plastic components). In one example, the first 72, second 74, and third 76 transport devices are conveyors. The first 72, second 74, and third 76 transport devices may be slip conveyors, belt-type conveyors, transport conveyors, vibrational conveyors, sorting conveyors, or the like. The first 72, second 74, and third 76 transport devices may convey segments of the product P along the x-axis in a direction parallel to arrows C.

In some aspects, the first 72, second 74, and third 76 conveyors do not communicate with one another. That is to say, items on the first conveyor 72 do not touch or mix with items on both the second conveyor 74 and the third conveyor 76. Thus, items on each of the conveyors are maintained separately.

As the segments are conveyed toward the second side surface 22B, the segments may reach a plurality of outlets 80. A number of outlets 80 may be equal to a number of transport devices. As such, in the embodiment of FIG. 1, there are three outlets 80, wherein a first outlet 82 corresponds to the first transport device 72, a second outlet 84 corresponds to the second transport device 74, and a third outlet 86 corresponds to the third transport device 76. Each of the first 82 second 84, and third 86 outlets may be doors configured to open in response to confirmation of proper destruction of the product P. The confirmation may be based on feedback from one or more of the cameras 54. Additionally or alternatively, the doors may open in response to segments of the product P being within a threshold proximity of the outlets. The threshold proximity may be between one to 24 inches. In one example, the threshold proximity is three inches.

In some embodiments, the transport system 70 may further comprise reject devices arranged within the proximity of the outlets such that the reject devices may convey segments cut incorrectly away from the outlets 80. As an example, if a segment on the first transport device 72 is within the threshold proximity of the first outlet 82 and it is determined that the segment does not meet guidelines for the current cutting mode, then the first outlet may not open and the reject device system may be activated. In one example, the reject device is a conveyor, slide, or chute configured to convey the incorrectly cut segment in a direction perpendicular or oblique to the first conveyor away from the first outlet to a second location.

When the segments are within the threshold proximity of the outlets 80, the outlets may open to allow the segment to move into a storage system 90. A first container 92 may be arranged on an opposite side of the second side surface 22B relative to the first transport device 72. Thus, the first outlet 82 may optionally couple the first container 92 to the first transport device 72 such that segments of the product P may be conveyed to the first container. Likewise, the second outlet 84 may be arranged between a second container 94 and the second transport device 74. Similarly, the third outlet 86 may be arranged between the third container 96 and the third transport device 76.

Although the description above relates to cutting and demilitarization of guns, it will be appreciated by those of ordinary skill in the art that the cutting kit 1 may be utilized to cut a variety of products. Furthermore, the cutting system 70, the transport system 80, and the storage system 90 may be used in combination to sort and organize different cuts of a product. For example, different sizes of metal may be cut in the cutting room 10, wherein the first container 92 may store a first size of metal and the second container 94 may store a second size of metal different than the first size.

Turning now to FIG. 2, it shows a method 200 for positioning a product into the cutting room and identifying the type of product. Instructions for carrying out method 200 and the rest of the methods included herein may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

The method 200 may begin at 202, where the method may include determining if a robot is free to receive a product. The robot may be free if it is not currently facilitating cutting of a product. In some examples where the cutting room may comprise multiple robots, product may be received when at least one of the robots is not facilitating cutting of a product.

If a robot in the cutting room is not free to receive product, then the method 200 may proceed to 204 and does not remove the product from the interfacing system. If a robot in the cutting room is free to receive product, then the method may proceed to 206 to remove the product from the interfacing system. This may include actuating the interfacing system such that the product is positioned within the cutting room for the robot to grab.

At 208, the method may include scanning a serial number of the product. In some examples, the serial number may be a stock number. The scanning may include imaging the product via cameras arranged in the cutting room and/or on the robot.

At 210, the method 200 determines if the serial number of the product is legible. In some examples, the serial number may be rubbed off, sanded down, smudged, or the like. As such, the method may determine if letters and/or numbers of the serial number are able to be deciphered. If the serial number is illegible, then the method may proceed to 212 to flag the product. By flagging the product, an operator may be notified of the illegible serial number and place the product aside for manual determination of the serial number and/or manual destruction.

If the serial number is legible, the method 200 may proceed to 214 to determine if the serial number matches a serial number stored in a data table. In some examples, the serial number may be stored in a national registry, wherein product type, date of manufacture, owner, and the like are stored with the serial number. If the serial number does not match a stored serial number, then the method 200 may proceed to 212 and flag the product as described above. If the serial number does match a serial number stored in a registry, then the method 200 may transition to 302 of method 300.

In some examples, additionally or alternatively, a registry of destroyed products may be generated by the system. For example, when a serial number of a product is scanned, a registry entry may be created. The registry may comprise information related to a type of weapon, a date of manufacture, a date of destruction, a make and/or model number, a serial number, a history, source, and a previous owner.

Turning now to FIG. 3, it shows a method 300 for determining a product type and orientation, along with performing a series of cuts to disassemble the product. As described above, the method 300 may begin at 302, wherein the step 302 may be executed following determination that a serial number matches a serial number stored in a look-up table. In some examples, additionally or alternatively, the step 214 of method 200 may be omitted and the step 302 of method 300 may be executed following determination that the serial number of the product is legible.

At 302, the method 300 may include determining a product type. The product type may include determining what the product is. For example, the product may be a specific weapon, a prototype, or the like. This may be determined via the serial number or by imaging the product. An image of the product may be captured while the product is in the interfacing system or in the cutting room. The image of the product may be compared to images stored in a look-up table. Additionally or alternatively, a human machine interface (HMI) and/or control module may allow a user to manually input the product type.

At 304, the method 300 may include adjusting cutting settings based on the product type. The adjusting may include activating a cutting mode corresponding to the product type. For example, if the product type is a 7.62 mm coaxial machine gun, then the method may adjust a cutting setting to activate a 7.62 mm coaxial machine gun cutting mode. In one example, a single cutting mode may be associated with each robot and to each robot cutter of the cutting room. That is to say, a combination of a first robot and first cutter may cut a first product and a combination of a second robot and a second cutter may cut a second product without interfering with one another.

At 306, the method may include determining an orientation of the product. The cutting settings set at 304 may be dependent on the orientation of the product as it is positioned in the cutting system. In some examples, the orientation of the product may be predetermined, where the orientation is based on a placement of the product in the interfacing system. Additionally or alternatively, the orientation of the product may be based on a manner in which the robot receives the product. The robot may be configured to grab a location of the product wherein cutting may not be demanded.

At 308, the method 300 may include determining if the product orientation matches a desired orientation. For example, determining if the product orientation matches a desired orientation may be based on feedback from one or more of the imaging devices, such as imaging devices 54 of FIG. 1. One or more images of the product may be captured via the one or more imaging devices. Each of the images captured may be compared to a corresponding baseline image stored as a positional image in memory. That is to say, a first imaging device may comprise a first baseline image and a second imaging device may comprise a second baseline image, wherein the second baseline image differs from the first baseline image due to vantage points of the imaging devices. A comparison result may be generated, wherein the comparison result indicates a degree of match between a current orientation of the product and the desired orientation of the product. If the degree of match is within the threshold percentage, then the product may be arranged as desired and the method 300 may proceed. However, if the degree of match is outside of the threshold percentage, then the comparison result may deliver an alert, which may include instructions on how to adjust the product to sufficiently match the desired orientation.

In one example, the desired orientation may be a stored in memory as a positional memory, wherein the desired orientation is used as a baseline or the like for future operations of the cutting room. In some examples, each imaging device of the imaging devices 54 may comprise an image corresponding to the desired orientation. Due to a vantage point of each of the imaging devices being different, different images captured by each of the imaging devices may be stored in memory and correspond to the desired orientation.

In some examples, matching the desired orientation may include being within a threshold percentage of the desired orientation. For example, the threshold percentage may be greater than or equal to 95%. As such, if the current product orientation matches the desired orientation by 95% or more, then the product orientation may match the desired orientation. If the product orientation does not match the desired orientation, then the method may proceed to 310 to adjust the product orientation. Adjusting the product orientation may include actuating a receiving end of the robot via twisting, turning, rotating, flipping, spinning, tilting, and/or a combination thereof to adjust a position of the product toward the desired orientation When the product orientation matches the desired orientation, then the method may proceed to 312 to position the product at the first cutter of the cutting system. At 314, the method may include performing a first cut set. The first cut set may include one or more cuts.

At 316, the method may include positioning the product at the second cutter. At 318, the method may include performing a second cut set. In one example, the first cut set and the second cut set are a combination of cuts to meet a single cut guideline. As such, the product may oscillate between each of the first cutter and the second cutter or all cuts may be performed by a single cutter.

Additionally or alternatively, the first cutter and the second cutter may comprise separate cutting settings for separate product types. As such, the product may not oscillate between the first and second cutters. Thus, a first product may be maintained positioned at the first cutter where the first cutter may be the sole cutter disassembling the first product. Likewise, a second product may be maintained positioned at the second cutter where the second cutter may be the sole cutter disassembling the second product. In this way, the first cutter may not cut the second product and the second cutter may not cut the first product.

At 320, the method includes determining if the product is sufficiently cut. This may include determining if the product has been cut at each of the designated spots included in the disassembly guidelines. If the product has not been sufficiently cut, then the method may proceed to 322 to continue the cutting process, which may include repositioning the product at the first and/or second cutters.

If the product is sufficiently cut, then the method may proceed to 324 to stop cutting the product. This may include deactivating the first and second cutters.

At 326, the method may include disposing uncuttable portions of the product. In some embodiments of the method 300, the step 326 may be omitted if the product does not comprise any portions that are uncuttable.

Turning now to FIG. 4, it shows a method 400 for determining if a cut product meets specifications and ejecting the product to a collection system. The method 400 may be used in combination with the cutting kit 1 of FIG. 1. In some operations of the cutting kit, the method 400 may not be executed.

The method 400 may begin at 402, where the method 400 includes capturing an image of the cut product. As described above, the cut product may be conveyed on a transport device of a transport system toward the outlet system. The image may be compared to specifications detailing where cuts are to occur.

At 404, the method may include determining if the cut product meets specifications. The cut product may not meet specifications if the cutting system cut an incorrect position of the product, if an orientation of the product was incorrect, and/or if the type of product determined was incorrect. The cut product may meet specifications if the cutting system cut at the correct position and displaced a desired amount of the product (e.g., greater than 0.5 inches).

In some examples, one or more imaging devices may capture one or more baseline images which may be compared to future images to determine if the cut product meets specifications. That is to say, a product may be cut according to specifications, and the one or more imaging devices may capture one or more images of the cut product, wherein the images captured are stored in memory as baseline images.

The baseline images may be used to compare future images captured of a cut product to determine if the product was cut according to specifications. In some examples, the comparison may determine if one or more of the cuts executed on the product traverse a desired location, extend in a desired angle, and/or displace a desired amount of product. The comparison may determine a degree of match between a currently cut product and the baseline. If the degree of match is within a threshold match (e.g., 95% or greater match), then the method 400 may proceed to dispose of the product. If the degree of match is outside of the threshold match, then the comparison may provide instructions of adjustments to the cuts for the cut product to meet the desired specifications.

If the cut product meets specifications, then the method 400 may proceed to 406 to open the outlet door. In some embodiments, the transport system may comprise a plurality of transport devices, each corresponding to an outlet door. Thus, opening the outlet door may further include opening the outlet door in response to the cut product being within a threshold proximity of the outlet door along with determination that the cut product meets specifications.

At 408, the method 400 may include conveying the cut product through the outlet door and into the storage system. The cut product may be stored in a container of the storage system arranged outside of and exterior to the cutting room.

At 410, the method 400 may include closing the outlet door.

Returning to 404, if the cut product does not meet specifications, then the method may proceed to 412 where the method may include setting a flag. The flag may signal to a user that the cut product does not meet specifications and re-cutting the product may be desired.

At 414, the method 400 may include conveying the product to the outlet door and not opening the outlet door. The outlet door may remain closed and does not allow the improperly cut product to transfer to the storage system.

At 416, the method 400 may include conveying the product away from the outlet door. This may include activating a discharge device arranged within the threshold proximity of the outlet door. For example, the discharge device may be a discharge conveyor configured to convey the improperly cut product in a direction away from the outlet door. In some examples, the direction may be angled to an original direction of conveyance toward the door. In one example, the direction is perpendicular to the original direction of conveyance. In some examples, the improperly cut product may be conveyed to container storing only flagged products. The flagged products may be stored within the cutting room.

At 418, the method may include re-cutting the product. This may include the robot selecting the cut product, determining what type of product the cut product belongs to, and adjusting a cutting mode of a cutter. Alternatively, flagged products may be cut manually, which may include deactivating the cutting room to allow a user to enter the room to retrieve the flagged products. The user may then activate a torch to manually cut the flagged products.

Turning now to FIG. 5, it shows a method 500 for assigning a cutting mode based on a selection at a human interface system (e.g., human interface system 114 of FIG. 1). The method 500 begins at 502, wherein the method may include presenting product types on a human interface system screen. An operator may select one or more product types via a keyboard, remote, and/or touchscreen. In some examples, the operator may select only one product for a cutting room, wherein a cutting mode is associated with the one product. Additionally or alternatively, the operator may select a plurality of products associated with a plurality of cutting modes for a cutting room. In some embodiments, the product types presented may be based on a predicted product type, wherein the prediction is based on imaging in the interfacing system or the like. This may accelerate a product selection process. Additionally or alternatively, the human interfacing system may display a previous product type selected, thereby assuming that more of the same product is to be cut.

At 504, the method 500 may include assigning a cutting mode to one or more cutters based on the selections. For example, if the cutting room is configured to cut only one type of product at a time, then a single cutting mode may be assigned to each of the cutters arranged within the cutting room. Alternatively, if the cutting room is configured to cut multiple types of products at a time, then each cutter of the cutting room may be assigned a different cutting mode.

Turning now to FIG. 6, it shows a method 600 for retaining a product to be cut in a desired orientation via one or more locking elements. The method 600 may begin at 602, where the method may include restraining the product in the interfacing system in a desired orientation via one or more locking elements. The locking elements may include clamps, racks, fixtures, trays, a mold, and the like. In one example, the mold may be based on a type of product being positioned in the interfacing system, wherein the mold matches an outline of the product. Herein, the locking elements are clamps. The clamps may physically hold the product P in the desired orientation. An operator may position the product in the interfacing system and clamp each of the clamps to the products. Alternatively, an automated feed system (e.g., a conveyor or robot) may position the product in the interfacing system, wherein the interfacing system may adjust an orientation of the product until the product is correctly arranged and securely restrained via the clamps.

At 604, the method 600 may include positioning the product in the cutting room. As described above, the product may be positioned in the interfacing system outside of the cutting room, wherein the interfacing system may rotate or slide, thereby positioning the product in the cutting room. The product may not move or slide as the interfacing system actuates. Thus, the product is maintained in the desired orientation as it travels into the cutting room.

At 606, the method 600 may include unlocking the locking elements so that the robot in the cutting room may retrieve the product. In some examples, the locking elements may not unlock until the robot has gripped the product at a desired location. In other examples, the locking elements unlock once the product is positioned in the cutting room.

In this way, a cutting kit may comprise a cutting room, an interfacing system, and a storage system. The cutting room may comprise at least one robot and at least one imaging device. The imaging device may be used to determine when the robot is in a condition capable of receiving a product from the interfacing system. The robot may then position the product at a cutting system, where cut portions of the product may fall to a transport system to be conveyed to the storage system. The technical effect of disassembling the product within the cutting room is to increase a rate at which products may be disassembled relative to a manual system. Furthermore, the cutting room may not allow a user to enter while it is cutting product, thereby creating a more comfortable work environment as the user is spaced away from the cutting, which may limit heat and fume exposure as well as exposure to sharp materials.

An embodiment of a system comprises a cutting room having a receiving device configured to orient a product in a desired position, a cutting system within the cutting room comprising at least one cutter, wherein the cutting system is configured to administer a plurality of pseudorandomized cuts via the at least one cutter to the product, a transport system comprising at least one transport device arranged below the at least one cutter for transporting pieces of the product, and at least one outlet associated with the transport device arranged on a surface of the cutting room. A first example of the system further includes where the receiving device receives the product from an interfacing system, the interfacing system configured to position the product within the cutting room in response to the receiving device being positioned to receive the product. A second example of the system, optionally including the first example, further includes where the receiving device is a robot, and wherein the robot comprises an image capturing device configured to provide feedback corresponding to an orientation of the product. A third example of the system, optionally including the first and/or second examples, further includes where the cutting room comprises at least one image capturing device. A fourth example of the system, optionally including one or more of the first through third examples, further includes where the at least one cutter is a first cutter, the cutting system further comprising a second cutter. A fifth example of the system, optionally including one or more of the first through fourth examples, further includes where the at least one cutter is a first cutter, the cutting system further comprising a second cutter. the first cutter and the second cutter are robots. A sixth example of the system, optionally including one or more of the first through fifth examples, further includes where the at least one cutter is a first cutter, the cutting system further comprising a second cutter. at least one of the first cutter and the second cutter are shredders. A seventh example of the system, optionally including one or more of the first through sixth examples, further includes where the at least one transport device is a conveyor.

An embodiment of a method for destroying a product comprises determining a product type of the product, orienting the product in a cutting room, positioning the product in a cutting system via a robot, conveying cut portions of the product via a transport system to an outlet system, and opening an outlet of the outlet system in response to the cut portions being within a threshold proximity of the outlet. A first example of the method further includes where orienting the product includes receiving the product from an interfacing system via a robot, and where the robot adjusts an orientation of the product via twisting, turning, spinning, flipping, rotating, and tilting. A second example of the method, optionally including the first example, further includes where opening the outlet further includes determining if the product is correctly cut based on feedback from one or more image capturing devices, and where the outlet opens in response to the product being correctly cut, and where the product is correctly cut in response to one or more cuts being executed at one or more desired locations. A third example of the method, optionally including the first and/or second examples, further includes where the outlet is closed in response to the product being incorrectly cut, and where a discharge device of the transport system is activated in response to the cut portions of the incorrectly cut product being within the threshold proximity to the outlet, and where the discharge device conveys the cut portions in a direction angled to its original direction of conveyance toward the outlet, and where the product is incorrectly cut in response to one or more cuts executed on the product being outside of one or more desired locations. A fourth example of the method, optionally including one or more of the first through third examples, further includes where the positioning further comprises the robot oscillating the product between cutters of the cutting system. A fifth example of the method, optionally including one or more of the first through fourth examples, further includes where the cutting system comprises a plurality of cutters, and where each cutter of the plurality of cutters corresponds to a robot. A sixth example of the method, optionally including one or more of the first through fifth examples, further includes where selecting a cutting mode associated with each cutter of the plurality of cutters, the cutting mode based on the product type the robot positions at each cutter of the plurality of cutters.

An embodiment of a cutting room comprises at least four surfaces defining an area of a room, at least one of the four surfaces comprising a cutout for admitting a product from an interfacing system to an interior of the room, at least one cutter arranged in the room, and at least one conveying device arranged in the room, the conveying device arranged to transport the product within a threshold proximity of the at least one cutter, wherein the at least one cutter cuts the product with a plurality of pseudorandom cuts. A first example of the cutting room further includes where the at least four surfaces comprise coplanar sets of surfaces defining a square shape of the room, and where the interfacing system is arranged outside of the area of the room. A second example of the cutting room, optionally including the first example, further includes where the product is a first product, and where the at least one cutter cuts the first product within a threshold range of a plurality of predesignated areas via a first set of cuts, further comprising a second product transported via the at least one transport device through the room after the first product, wherein the at least one cutter cuts the second product within the threshold range of the plurality of predesignated area via a second set of cuts, wherein the second set of cuts is different than the first set of cuts by at least one cut at least one predesignated area, wherein the at least one cut of the second set of cuts differs in one or more of angle and location relative to at least one cut of the first set of cuts. A third example of the cutting room, optionally including the first and/or second examples, further includes where the first product and the second product are identical in size and shape, and where the first product and the second product are firearms. A fourth example of the cutting room, optionally including one or more of the first through third examples, further includes where the room further comprises one or more sensors and visualizing devices coupled to one or more of the at least four surfaces for visually determining one or more of a product type, a cut orientation, a cut location, and a number of cuts.

Note that the example control and estimation routines included herein can be used with various cutting system configurations. The control methods and routines disclosed herein may be stored as executable instructions in non-transitory memory and may be carried out by the control system including the controller in combination with the various sensors, actuators, and other hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the control system, where the described actions are carried out by executing the instructions in a system including the various hardware components in combination with the electronic controller.

It will be appreciated that the configurations and routines disclosed herein are exemplary in nature, and that these specific embodiments are not to be considered in a limiting sense, because numerous variations are possible. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for destroying products comprising:
determining a product type of a first and second product;
orienting the first and second products in a cutting room comprising at least four surfaces defining an area of the room, at least one of the four surfaces comprising a cutout for admitting the products from an interfacing system to an interior of the room;
positioning the first and second product in a cutting system via a robot;
cutting the first and second product with a plurality of pseudorandom cuts;
conveying first cut portions of the first product and second cut portions of the second product via a transport system to an outlet system;
for the first product:
determining that the first cut portions of the first product are within a threshold proximity of the outlet;
further determining that the first product is correctly cut based on feedback from one or more image capturing devices;
further determining that the one for more cuts of the first cut portions are each executed within one or more predetermined threshold locations;
and opening the outlet of the outlet system;
for the second product;
determining that the second cut portions of the second product are within a threshold proximity of the outlet;
further determining that the second product is incorrectly cut based on feedback from one or more image capturing devices;
further determining that one or more cuts executed on the second product are outside of the one or more predetermined threshold locations;
activating a discharge device of the transport system;
and conveying the second cut portions, by the discharge device, in a direction angled to an original direction of conveyance toward the outlet;
and not opening the outlet of the outlet system.

2. The method of claim 1, wherein orienting the product includes receiving the product from an interfacing system via the robot, and where the robot adjusts an orientation of the product via one or more of twisting, turning, spinning, flipping, rotating, and tilting.

3. The method of claim 1, wherein the positioning further comprises the robot oscillating the product between cutters of the cutting system.

4. The method of claim 1, wherein the cutting system comprises a plurality of cutters, and where each cutter of the plurality of cutters corresponds to one robot of a plurality of robots.

5. The method of claim 4, further comprising selecting a cutting mode associated with each cutter of the plurality of cutters, the cutting mode based on the product type the one robot positions at each cutter of the plurality of cutters.

6. A cutting room comprising:
at least four surfaces defining an area of a room, at least one of the four surfaces comprising a cutout for admitting a first and second product from an interfacing system to an interior of the room, and at least one outlet for removing cut portions of the first and second product from the interior of the room;
at least one cutter arranged in the room; and
wherein the at least one cutter cuts the first and second product with a plurality of pseudorandom cuts;
at least one conveying device arranged in the room, the conveying device arranged to transport the first and second product to the at least one cutter and conveys cut portions of the first and second products to within a threshold proximity of the at least one outlet;
at least one image capturing device; and
a controller with instructions stored therein for opening and closing the at least one outlet, wherein opening the at least one outlet includes determining if the first product is correctly cut at each of one or more threshold locations and closing the at least one outlet includes determining that the second product is cut outside the one or more threshold locations based on feedback from the at least one image capturing device; and
wherein the conveying device conveys correctly cut portions of the first product in a first direction toward the outlet and wherein the outlet opens in response to the correctly cut portions being within the threshold proximity, and
wherein the outlet closes in response to incorrectly cut portions of the second product being within the threshold proximity and activating the discharge device to convey the incorrectly cut portions in a second direction angled to a first direction of conveyance toward the outlet.

7. The cutting room of claim 6, wherein the at least four surfaces comprise coplanar sets of surfaces defining a square shape of the room, and where the interfacing system is arranged outside of the area of the room.

8. The cutting room of claim 6, wherein the product is a first product, and where the at least one cutter cuts the first product within a threshold range of a plurality of predesignated areas via a first set of cuts, further comprising a second product transported via the at least one transport device through the room after the first product, wherein the at least one cutter cuts the second product within the threshold range of the plurality of predesignated area via a second set of cuts, wherein the second set of cuts is different than the first set of cuts by at least one cut at least one predesignated area, wherein the at least one cut of the second set of cuts differs in one or more of angle and location relative to at least one cut of the first set of cuts.

9. The cutting room of claim 8, wherein the first product and the second product are identical in size and shape, and where the first product and the second product are firearms.

10. The cutting room of claim 6, wherein the room further comprises one or more sensors and visualizing devices coupled to one or more of the at least four surfaces for visually determining one or more of a product type, a cut orientation, a cut location, and a number of cuts.

11. The cutting room of claim 6, wherein the cutting room further comprises at least one outlet associated with the transport device arranged on a surface of the cutting room.

12. The cutting room of claim 6, wherein the cutting room further comprises a receiving device configured to orient a product in a desired position.

13. The cutting room of claim 12, wherein the interfacing system is configured to position the product within the cutting room in response to the receiving device being positioned to receive the product.

14. The cutting room of claim 12, wherein the receiving device is a robot, and wherein the robot comprises an image capturing device configured to provide feedback corresponding to an orientation of the product.

15. The cutting room of claim 6, wherein the cutting room comprises at least one image capturing device.

16. The cutting room of claim 6, wherein the at least one cutter is a first cutter, the cutting room further comprising a second cutter.

17. The cutting room of claim 16, wherein the first cutter and the second cutter are robots.

18. The cutting room of claim 16, wherein at least one of the first cutter and the second cutter are shredders.

* * * * *